United States Patent
Cardinal et al.

(10) Patent No.: US 7,890,217 B2
(45) Date of Patent: Feb. 15, 2011

(54) INTEGRATED REAL-TIME POWER AND SOLAR FARM CONTROL SYSTEM

(75) Inventors: Mark Edward Cardinal, Schenectady, NY (US); Minesh A. Shah, Clifton Park, NY (US); Andreas Kirchner, Osnabrueck (DE); Timothy B. Cribbs, Roanoke, VA (US); Anthony Galbraith, Wirtz, VA (US); Enno Ubben, Salzbergen (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/606,134

(22) Filed: Oct. 26, 2009

(65) Prior Publication Data

US 2010/0114397 A1    May 6, 2010

(51) Int. Cl.
| | | |
|---|---|---|
| G05D 3/12 | (2006.01) | |
| G05D 5/00 | (2006.01) | |
| G05D 9/00 | (2006.01) | |
| G05D 11/00 | (2006.01) | |
| G05D 17/00 | (2006.01) | |
| G05B 11/01 | (2006.01) | |
| H02M 5/257 | (2006.01) | |
| C23C 14/00 | (2006.01) | |
| C23C 14/32 | (2006.01) | |
| F03G 6/00 | (2006.01) | |
| F03G 7/00 | (2006.01) | |

(52) U.S. Cl. ............... 700/297; 700/22; 700/286; 700/287; 700/295; 700/298; 323/322; 323/323; 204/196.27; 60/641.11

(58) Field of Classification Search ............ 700/22, 700/286–287, 295, 297–298; 323/906, 322–32; 204/196.27; 60/641.11
See application file for complete search history.

(56) References Cited

U.S. PATENT DOCUMENTS

| | | | | | |
|---|---|---|---|---|---|
| 4,345,584 | A | * | 8/1982 | Royer | 126/610 |
| 6,037,758 | A | * | 3/2000 | Perez | 323/268 |
| 6,106,970 | A | * | 8/2000 | Kalarney | 429/96 |
| 6,512,966 | B2 | * | 1/2003 | Lof et al. | 700/291 |
| 6,529,839 | B1 | * | 3/2003 | Uggerud et al. | 702/61 |
| 7,509,190 | B2 | * | 3/2009 | Emery et al. | 700/291 |

(Continued)

OTHER PUBLICATIONS

Solar Energy Generation at the Community Level, Rhoden, Jr. et al., pp. 1-24, Nov. 2009.*

(Continued)

*Primary Examiner*—Ramesh B Patel
(74) *Attorney, Agent, or Firm*—Sutherland Asbill & Brennan LLP

(57) ABSTRACT

Certain embodiments of the invention may include systems and methods for controlling power in renewable solar energy sources. According to an example embodiment of the invention, a method is provided for controlling a renewable energy solar farm, where the farm may include one or more renewable energy sources. The method may include measuring aggregate energy output of the renewable energy solar farm and measuring individual source energy output of the one or more renewable energy sources. The method may also include controlling energy production from the one or more renewable energy sources via a controller based at least in part on the measured aggregate energy output and the measured individual source energy output, where the controller facilitates communications with the one or more renewable energy sources.

20 Claims, 5 Drawing Sheets

U.S. PATENT DOCUMENTS

| | | | |
|---|---|---|---|
| 7,580,817 B2* | 8/2009 | Bing | 703/6 |
| 2002/0019758 A1* | 2/2002 | Scarpelli | 705/7 |
| 2003/0006613 A1* | 1/2003 | Lof et al. | 290/44 |
| 2005/0039787 A1* | 2/2005 | Bing | 136/243 |
| 2006/0208571 A1* | 9/2006 | Fairlie | 307/11 |
| 2007/0236187 A1* | 10/2007 | Wai et al. | 323/222 |
| 2008/0249665 A1* | 10/2008 | Emery et al. | 700/291 |
| 2009/0055300 A1* | 2/2009 | McDowell | 705/34 |
| 2009/0146501 A1* | 6/2009 | Cyrus | 307/84 |
| 2010/0072818 A1* | 3/2010 | Kelly | 307/68 |
| 2010/0145532 A1* | 6/2010 | Gregory et al. | 700/286 |

OTHER PUBLICATIONS

Solar System Presentation.
Technical Documentation.

* cited by examiner

INTEGRATED REAL-TIME POWER AND SOLAR FARM CONTROL SYSTEM

FIELD OF THE INVENTION

This invention generally relates to renewable energy sources, and more particularly, to systems and methods for controlling power in renewable solar energy sources.

BACKGROUND OF THE INVENTION

Solar farms are generally categorized as renewable variable power generation systems because the energy is harvested from sunlight: a naturally occurring and plentiful source of energy. However, the amount of power produced by the solar farm may vary as a function of cloud coverage and the position of the sun in the sky. Each solar farm may have a plurality of energy harvesting panels with associated photovoltaic cells and inverters that may require power monitoring and control for coordinating and providing power to the electrical grid. For example, a utility may monitor the grid power demand and may need to communicate with the solar farm to determine if the solar farm has the capacity to meet some or all of the power demand.

It is common to connect many small solar inverters to the electrical grid, making the collection of inverters appear as one power plant. As the number of inverters in the plant increases, it is important that the collection of inverters appears to the grid as if it was the same as other power plants. Because a solar farm can include many solar panels and inverters, there is a need for a centralized control to collectively manage the inverters along with all of the supporting plant data as one cohesive system. As more solar farms come on-line, the communication, coordination, and control among the plurality of farms becomes more and more critical. However, coordination also becomes more difficult when the multiple solar farms (with their multiple associated controllers) are tied together in ad-hoc systems. Therefore, a need exists for systems and methods for controlling power in renewable solar energy sources.

BRIEF SUMMARY OF THE INVENTION

Some or all of the above needs may be addressed by certain embodiments of the invention. Certain embodiments of the invention may include systems and methods for controlling power in renewable solar energy sources, for instance, integrated real-time power and solar farm control. According to an example embodiment of the invention, a method is provided for controlling a renewable energy solar farm, where the farm may include one or more renewable energy sources. The method may include measuring aggregate energy output of the renewable energy solar farm and measuring individual source energy output of the one or more renewable energy sources. The method may also include controlling energy production from the one or more renewable energy sources via a controller based at least in part on the measured aggregate energy output and the measured individual source energy output, where the controller facilitates communications with the one or more renewable energy sources.

According to another example embodiment, a system is provided for providing renewable solar energy. The system may include a solar energy farm including one or more renewable energy sources, one or more remote monitoring and control stations, one or more devices for measuring aggregate energy output from the solar energy farm, one or more devices for measuring individual source energy output from the one or more renewable energy sources, and a real-time controller for controlling power production of the one or more renewable energy sources based at least in part on the measured aggregate energy output and the measured individual source energy output, where the controller is operable to communicate with the one or more renewable energy sources.

According to another example embodiment, an apparatus is provided for controlling renewable energy. The apparatus may include a real time integrated controller operable to: measure aggregate energy output from a solar energy farm, where the solar energy farm comprises one or more renewable energy sources, measure individual source energy output from the one or more renewable energy sources, control energy production from the one or more renewable energy sources based at least in part on the measured aggregate energy output and the measured individual source energy output, and communicate with the one or more renewable energy sources.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying diagrams, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. The term "exemplary" as used throughout this document is defined to mean "example."

Certain embodiments of the invention may enable control of power in renewable solar energy farms. According to certain exemplary embodiments of the invention, a real-time integrated controller may be utilized to facilitate increased interoperability and control within the renewable solar farm. Other embodiments may be utilized to facilitate increased interoperability and control among multiple farms.

Various controllers, processors, modules, interfaces, communication links, and sensors for controlling power in renewable solar farms, according to embodiments of the invention, will now be described with reference to the accompanying figures.

Figure 1:
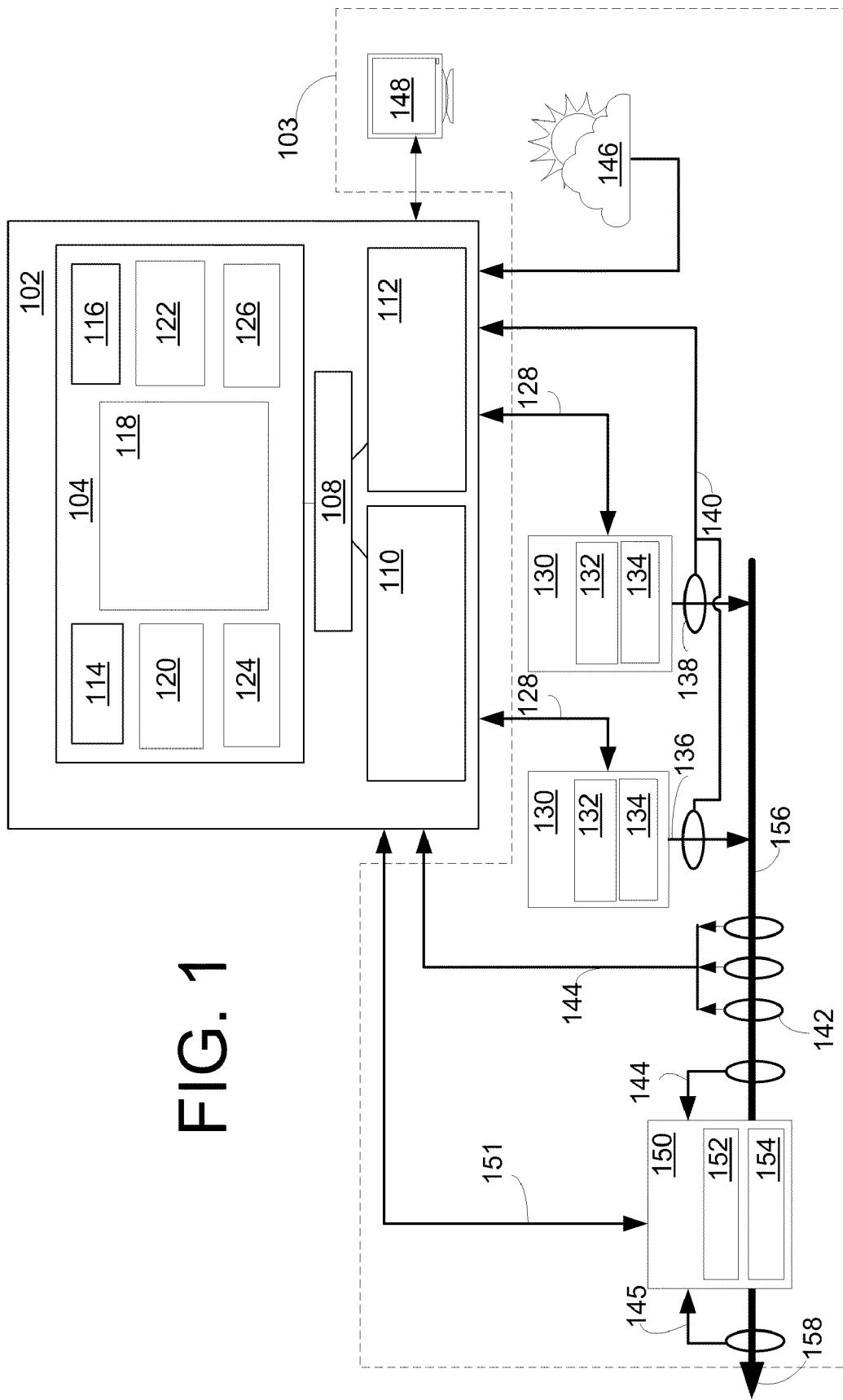
FIG. 1 is a block diagram of an illustrative energy farm control system, according to an exemplary embodiment of the invention.

FIG. 1 illustrates an exemplary block diagram of an energy farm control system 100. The system 100 may include a real-time integrated controller 102. The system 100 may also include other associated elements 103 in communication with the real-time integrated controller 102, including a plurality of communication channels 128, 140, renewable energy sources 130, sensors, power monitors 138, 142, weather sensors 146, substations 150, and remote monitoring and control stations 148. The real-time integrated controller 102 may communicate with, control, be controlled by, and/or coordinate the various functions associated with the other elements 103 associated with the system 100.

According to an exemplary embodiment, the real-time integrated controller 102 may include one or more processors 108. The real-time integrated controller 102 may include a memory 104, input/output (I/O) interfaces 110, and network interfaces 112, each in communication with the one or mores processors. According to exemplary embodiments of the invention, the memory 104 may comprise an operating system (OS) 114 and a region for data 116. A number of modules may reside in the memory 104 for controlling the various functions associated with the real-time integrated controller 102. In accordance with exemplary embodiments of the invention, the memory may include a farm control module 118 that may be operable to provide one or more of the following: voltage regulation, reactive power regulation, real power regulation, ramp rate control, startup control, shutdown control, voltage droop compensation, frequency droop compensation, line drop compensation and metering.

According to example embodiments of the invention, the memory 104 of the real-time integrated controller 102 may also support other modules for coordinating with other elements 103, including diagnostics 120, sequencing/restoration 122, plug and play 124 operations, and auto discovery 126. The auto discovery 126 module may work in conjunction with the plug and play 124 module for interfacing with other elements 103.

According to an example embodiment of the invention, the I/O interfaces 110 are operable to provide analog or digital communications. The analog communication channels may include scaling, limiting, polarity reversal, and/or filtering functions for conditioning input and output analog signals via the I/O interface 110. The digital communication channels may include scalable provisioning of bit depth, communication rates, and/or sample rates to facilitate flexible communications and protocols.

According to exemplary embodiments of the invention, the real-time integrated controller 102 may be in communication with one or more remote monitoring and control stations 148 via the I/O interface 110, network interface 112, or via wireless communication, power line carrier, internet, intranet, or any other suitable means of communication. According to exemplary embodiments, the remote monitoring and control station 148 may be operable, among other functions, to provide setpoints for use by the farm control module 118, to control startup/shutdown, to communicate with any of the other elements 103 in communication with the real-time integrated controller 102, and to receive monitoring information.

According to an exemplary embodiment of the invention, weather sensors 146 may provide information to the real-time integrated controller 102. The weather sensors 146 may be local to, or remote from the renewable energy sources 130, and may provide information including temperature, humidity, barometric pressure, wind speed, expected cloud coverage, etc., to the real time integrated controller 102.

According to exemplary embodiments of the invention, renewable energy sources 130 may be in communication with the real-time integrated controller 102. The renewable energy sources 130 may include solar power harvesting devices, including photovoltaic cells, inverters such as 134, and/or solar concentrators. The renewable energy sources 130 may also include energy storage devices such as 132, including batteries, capacitors, and/or thermal storage devices.

According to exemplary embodiments of the invention, the individual source energy output 136 from the renewable energy sources 130 may be monitored by power monitor 138, and the individual monitor signals may be communicated to the real-time integrated controller 102 for feedback and control. The real-time integrated controller 102 may provide control signals to the renewable energy sources 130 via one or two-way communications 128, and may adjust the various parameters of the renewable energy sources 130 in accordance with the individual source monitoring/feedback signals 140, and in response to requirements of the grid 158.

In accordance with exemplary embodiments of the invention, the aggregate energy output 156 of the farm may also be monitored by a power monitor 142 to provide aggregate monitoring/metering signals 144 that may also be used as feedback to the controller 102 for controlling the individual and/or collective power output from the renewable energy sources 130.

According to an exemplary embodiment of the invention, the real-time integrated controller 102 may be in communication with one or more substations 150. The substations may include one or more VAR banks 152 and/or one or more transformer load tap changers 154. The aggregate monitoring/metering signals 144 may be communicated to the substation 150, and according to an exemplary embodiment, the substation 150 may monitor its own output via the substation output monitoring signal 145. Processed or unprocessed monitoring signals 144, 145 may be communicated to the real-time integrated controller 102, and control signals may, in turn, be communicated back to the substation 150 for controlling the VAR banks 152 and/or tap changers 154.

Figure 2:
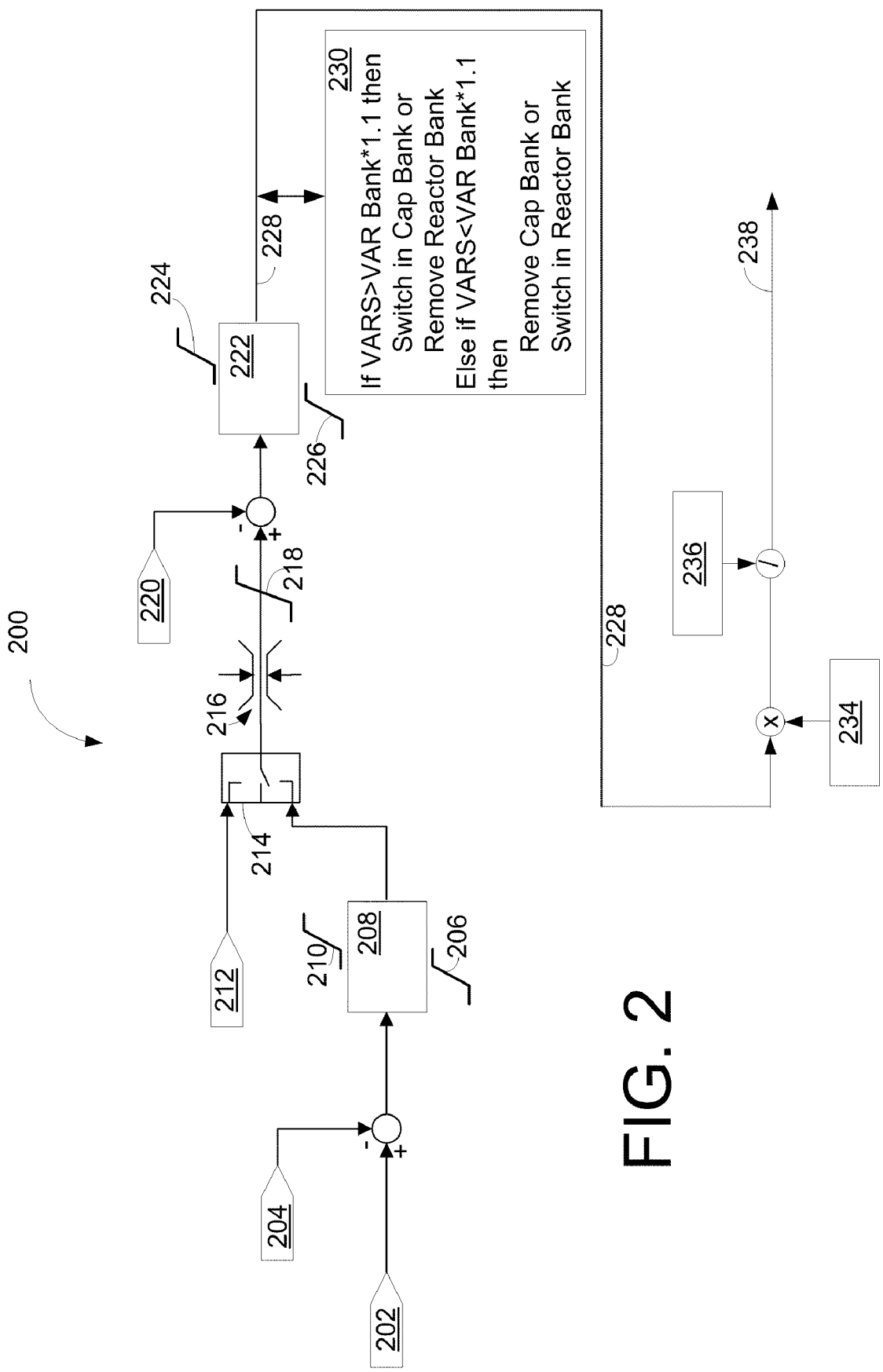
FIG. 2 is a block diagram of an illustrative example integrated energy farm voltage regulator, according to an exemplary embodiment of the invention.

FIG. 2 depicts an example integrated energy farm voltage regulator 200 with VAR bank control and hysteresis, according to an exemplary embodiment of the invention. The regulator 200 may determine and provide a power setpoint command 238 for each inverter, based on input setpoints (202, 212), farm, grid, or inverter measurements (204, 220, 236), and inverter ratings (224, 226, 234). The input setpoints may be provided to the farm control module 118 (FIG. 1) via I/O interfaces 110 or network interfaces 112. According to exemplary embodiments, the input setpoints may be provided by the remote monitoring and control stations 148. According to exemplary embodiments, the farm, grid, or inverter measurements may be provided by the individual source monitoring 138, aggregate monitoring 142, and/or substation output monitoring 145. According to exemplary embodiments, the integrated energy farm voltage regulator 200 may also be operable to determine and provide VAR bank commands for the substation 150, based at least upon a determined net VAR command 228 signal.

According to exemplary embodiments of the invention, and with continued reference to FIG. 2, the example integrated energy farm voltage regulator 200 may receive a power factor (or VAR) setpoint 202 as an input. Measured grid power factor (or VARs) 204 may be subtracted from the power factor (or VAR) setpoint 202 and the resulting signal may be input to a first PI regulator 208. The PI regulator 208 may include an apparent power limiter 206, and may have an optional reactive power (Q) reference input with real power (P) priority control. In an exemplary embodiment, the first PI regulator 208 may include a voltage limiter 210. According to an exemplary embodiment of the invention, the integrated energy farm voltage regulator 200 may be configured to regulate based either on power factor (or VAR) setpoint 202 or voltage setpoint 212 inputs. Switch 214 may be utilized to select the mode of regulation.

According to an exemplary embodiment of the invention, the selected regulation setpoint signal (i.e., either the voltage setpoint 212 or the signal derived from the PI regulated power factor (or VAR) setpoint 202) may be further processed by a voltage limiter 216 and/or a slew rate limiter 218. According to an exemplary embodiment, a measured grid voltage 220 may be subtracted from the output of the slew rate limiter 218, and the result may be input to a second PI regulator 222. The second PI regulator 222 may include a Q-min 226 limiter that may limit the net VAR command 228 signal to a minimum value about equal to the sum of the inverters 134 negative VAR capability. The second PI regulator 222 may also include a Q-max 224 limiter that may limit the net VAR command 228 signal to a maximum value about equal to the sum of the inverters 134 positive VAR capability.

In accordance with an exemplary embodiment of the invention, the second PI regulator 222 may produce a net VAR command 228, and this command may be utilized by VAR bank switching logic 230 to control the substation 150 via substation commands 151 to switch VAR banks 152 in or out, depending on a comparison of the net VAR command 228 and the measured VARs, which in accordance with an exemplary embodiment, may be communicated to the regulator 200 via a substation output monitoring 145 signal. An exemplary embodiment of the VAR bank switching logic 230 is depicted in FIG. 2.

According to an exemplary embodiment of the invention, the VAR command 228 may be converted to power setpoints 238 for individual (N) inverters 134 by multiplying the VAR command 228 by the inverter (N) reactive power rating 234 and dividing by the farm reactive power 236. The individual power setpoints 238 may then be communicated to the individual inverters 134 associated with each renewable energy source 130.

Figure 3:
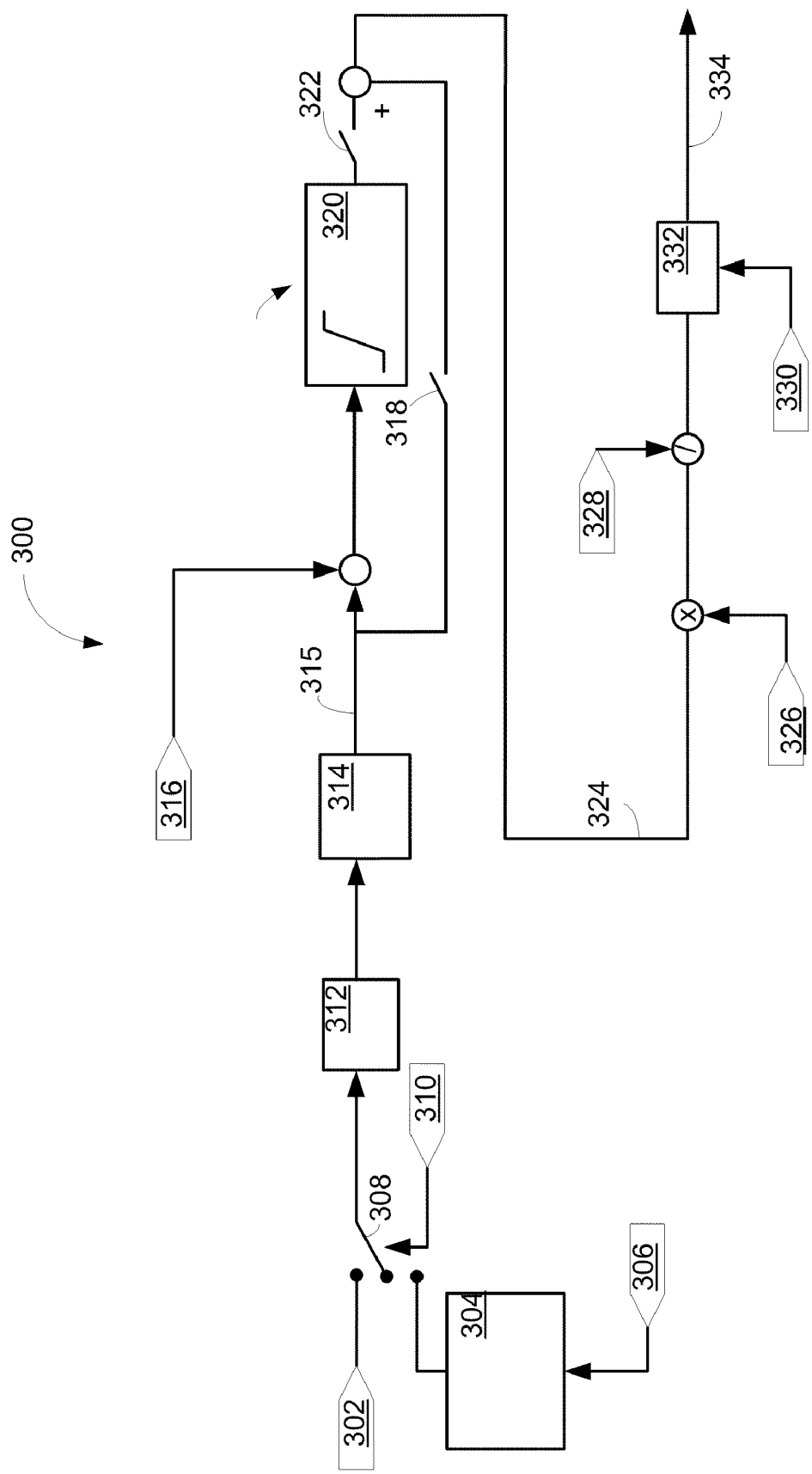
FIG. 3 is a block diagram of an illustrative example active or apparent power regulator, according to an exemplary embodiment of the invention.

FIG. 3 depicts another example power regulator 300 system that can be utilized to regulate the power output of individual or collective renewable energy sources 130. However, in this embodiment, power regulation may be based on an input apparent power setpoint 306 or on an active power setpoint 302, unlike the example integrated energy farm voltage regulator 200 system as shown in FIG. 2, which may regulate based on a power factor (or VAR setpoint) 202 or on a voltage setpoint 212.

According to an exemplary embodiment of the invention, the example active (or apparent) power regulator 300 may utilize an active/apparent power mode select 310 input to select, via a mode select switch 308, between either an active power setpoint 302 or an apparent power setpoint 306. The apparent power setpoint 306 input may be converted to an active power value via an S to P converter 304 before reaching the mode select switch 308. According to exemplary embodiments of the invention, the selected input setpoint may be limited by a rated power limiter 312 to limit the maximum power to the rated power of the farm. The output of the rated power limiter 312 may be further processed by a ramp limiter 314, which may limit the slew rate or ramp rate of the control signal 315.

In an exemplary embodiment, the actual (active) power of the farm may be measured and the actual power 316 value may be subtracted from the control signal 315 to produce an error signal that may be input into a PID controller 320. The PID controller 320 may limit the output, or the net farm power command 324, to within the rated power limits of the farm. In an exemplary embodiment, the PID controller 320 may include one or more of: an integrator, a ramp rate freeze control, a frequency droop control, a voltage droop control, and other regulators. In an optional embodiment, a feed forward control signal 315 may bypass the PID controller 320 via closing of the feed forward switch 318 and opening of the PID controller enable/disable switch 322 to produce the net farm power command 324. The feed forward option may be utilized in some embodiments to increase the responsiveness or bandwidth of the power regulator 300 system. According to exemplary embodiments, and using a similar approach as described above with reference to the example integrated energy farm regulator 200, the net farm power command 324 may be converted to individual power commands or setpoints 334 for the individual inverters 134 by multiplying the net farm power command 324 by the inverter rated power 326 of the individual inverter 134, and by dividing the result by the farm online rated power 328. According to an exemplary embodiment, the resulting power setpoint for power source N 334 may be limited to the maximum inverter power 330 by limiter 332 prior to being communicated to the individual inverter 134.

Figure 4:
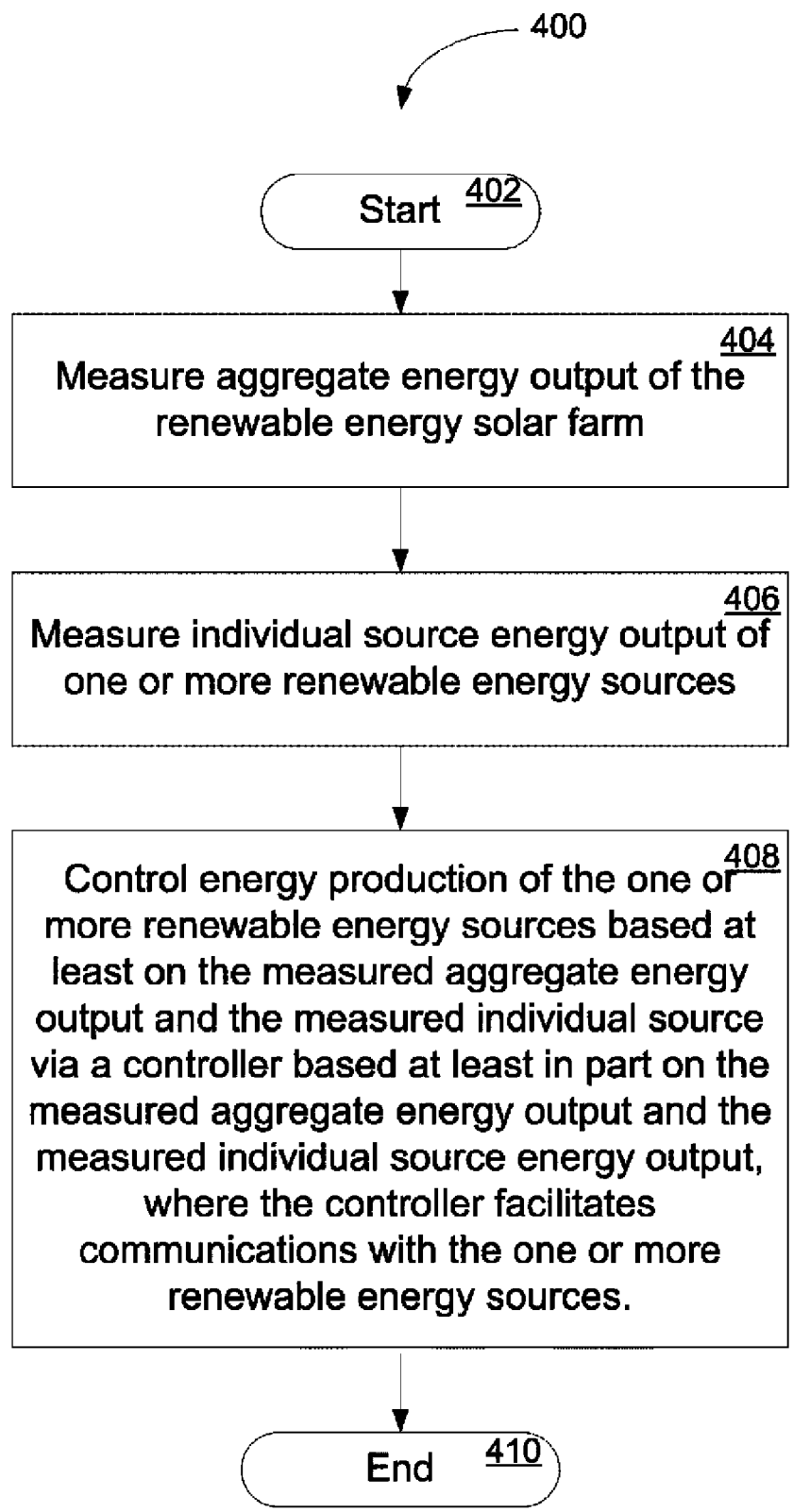
FIG. 4 is a flow diagram of an example method for controlling power, according to an exemplary embodiment of the invention.

An example method 400 for controlling a renewable energy solar farm, including one or more renewable energy sources, is now described with reference to the flow diagram of FIG. 4. The method 400 starts in block 402. In block 404 and according to an example embodiment of the invention, the aggregate energy output of the renewable energy solar farm is measured. In block 406, and according to an example embodiment, the individual source energy output of one or more renewable energy sources is measured. In block 408, and according to an example embodiment, energy production of the one or more renewable energy sources is controlled based at least on the measured aggregate energy output and the measured individual source via a controller based at least in part on the measured aggregate energy output and the measured individual source energy output, where the controller facilitates communications with the one or more renewable energy sources.

The method 400 ends in block 410.

According to exemplary embodiments of the invention, the energy farm control system 100 may perform a number of compensation functions via the farm control module 118, including frequency droop compensation, voltage droop compensation, and line drop compensation. The integrated energy farm control system 100 can implement line drop-compensating logic to correct for voltage drops, power and VAR losses on the line. The compensation may include consideration of line charging, which is typically unusual for compensation circuits. The compensation may also be constructed in the logic such that any limits (i.e., voltage) at the point of common coupling and at the substation 150 can also be controlled and enforced.

According to exemplary embodiments, the farm control module 118 may include a voltage regulator that can be configured with voltage droop compensation. Voltage droop compensation may be used to allow tightly coupled adjacent voltage regulators to share in the voltage regulation of a point that may be common to all the adjacent regulators.

According to exemplary embodiments, the farm control module 118 may include a frequency droop compensation and control function that may be configured to control the power output based upon the grid frequency. This frequency droop function may be operable to increase power output if the grid frequency decreases below nominal and in which the power output can be decreased if the grid frequency increases above nominal.

Figure 5:
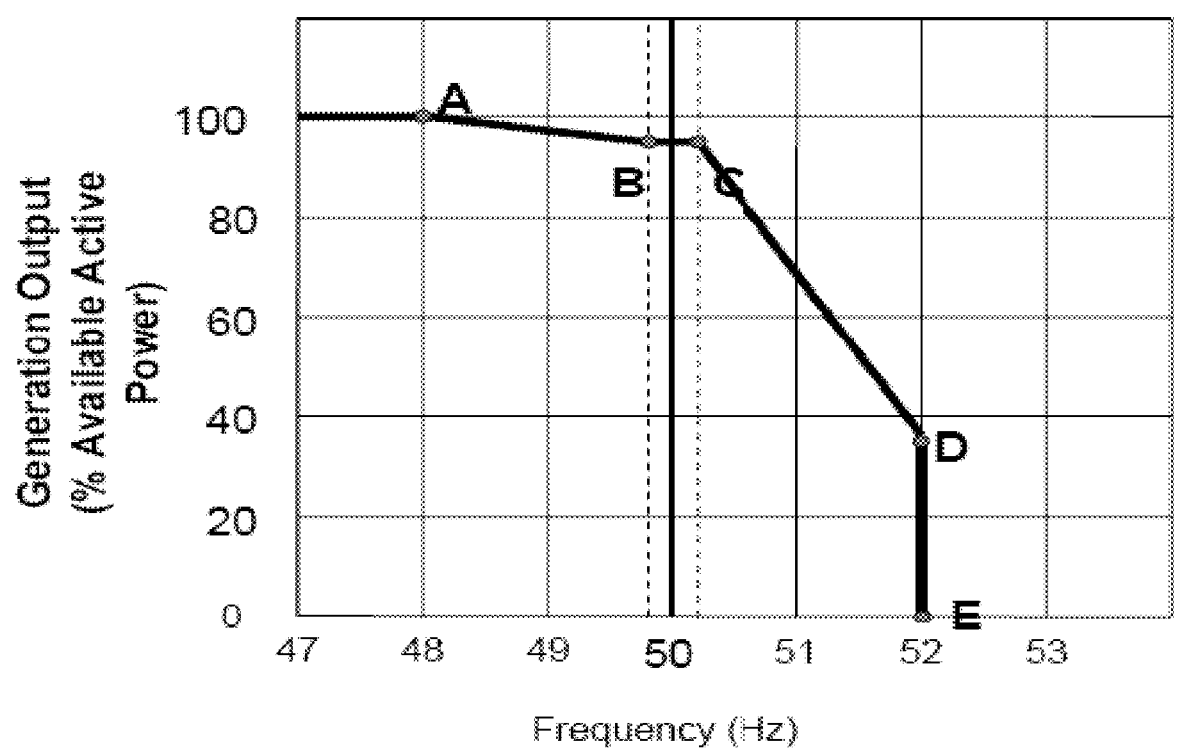
FIG. 5 is an example chart indicating a frequency control curve, according to an exemplary embodiment of the invention.

FIG. 5 depicts an exemplary graph of the concept of frequency droop compensation. In certain embodiments, the frequency droop compensator may comprise parameter sets and curves for controlling the power output of the renewable energy sources based on the measured frequency. According to an exemplary embodiment, the power output control may be based upon a percentage of the possible plant output power, and a nominal operating point (between letters B and C in FIG. 5) may be set such that the desired frequency is achieved at slightly reduced plant power output. This method may allow the power output to be adjusted higher (towards letter A) if the plant frequency decreases below nominal. Alternatively, the power output may be adjusted lower (towards letter D) if the plant frequency increases above nominal. According to exemplary embodiments of the invention, frequency control curves may be communicated from the real-time integrated controller 102 to the renewable energy sources 130 inverters 134 by a number of methods, including single digital or analog control signals, pulse width modulation, or by communicating control curve parameters.

Accordingly, example embodiments of the invention can provide the technical effects of creating certain systems and methods that provide centralized control of the various elements 103 associated with the production of energy from the renewable energy sources. Example embodiments of the invention can provide the further technical effects of providing systems and methods for facilitating and coordinating efficient communication and control between and among the various elements 103 associated with the energy farm control system 100.

In certain embodiments of the invention, the energy farm control system 100 may include any number of software applications that are executed to facilitate any of the operations.

In certain embodiments the real-time integrated controller 102 may communicate with any of the associated components in the energy farm control system 100 via wireless communication, power line carrier, internet, intranet, or any other suitable means of communication.

In certain embodiments, one or more I/O interfaces may facilitate communication between the energy farm control system 100 and one or more I/O devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the energy farm control system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the energy farm control system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the energy farm control system 100 with more or less of the components illustrated in FIGS. 1, 2 and 3.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for controlling a renewable energy solar farm comprising one or more renewable energy sources, the method comprising:
   measuring aggregate energy output of the renewable energy solar farm;
   measuring individual source energy output of the one or more renewable energy sources; and
   controlling energy production from the one or more renewable energy sources via a controller based at least in part on one or more of the measured aggregate energy output and the measured individual source energy output, wherein the controller facilitates communication with the one or more renewable energy sources.

2. The method of claim 1, wherein the controlling further comprises performing one or more of the following functions based at least in part on the measured aggregate energy output or on the measured individual source energy output: voltage regulation, power factor regulation, reactive power (VAR) regulation, real power (watt) regulation, ramp rate control, startup control, shutdown control, voltage droop compensation, frequency droop compensation, and line drop compensation.

3. The method of claim 1, further comprising monitoring and controlling the renewable energy solar farm by one or more remote monitoring and control stations.

4. The method of claim 1, further comprising communicating with and controlling substation components, wherein the substation components comprise one or more of: a VAR bank, and a transformer load tap changer.

5. The method of claim 1, wherein measuring the farm aggregate energy output comprises measuring one or more of: voltage, current, frequency, real power, reactive power, power factor, and power factor angle.

6. The method of claim 1, wherein measuring the individual source energy output comprises measuring one or more of: voltage, current, frequency, real power, reactive power, power factor, and power factor angle.

7. The method of claim 1, wherein the controller is operable to transmit control signals to, and to receive monitoring signals from, the one or more renewable energy sources.

8. A system for providing renewable solar energy, the system comprising:
   a solar energy farm comprising one or more renewable energy sources;
   one or more remote monitoring and control stations;
   one or more devices for measuring aggregate energy output from the solar energy farm;
   one or more devices for measuring individual source energy output from the one or more renewable energy sources; and
   a real-time controller for controlling power production of the one or more renewable energy sources based at least in part on the measured aggregate energy output and the measured individual source energy output, wherein the controller is operable to communicate with the one or more renewable energy sources.

9. The system of claim 8, wherein the real-time integrated controller further comprises:
   one or more computer processors;
   a memory in communication with the one or more computer processors;
   input and output interfaces in communication with the one or more computer processors and operable to receive and transmit analog or digital signals; and
   a farm control module in communication with the one or more computer processors, wherein the farm control module is operable to perform one or more of the following functions: voltage regulation, power factor regulation, reactive power regulation, real power (watt) regulation, ramp rate control, startup control, shutdown control, voltage droop compensation, frequency droop compensation, and line drop compensation.

10. The system of claim 8, further comprising one or more remote monitoring and control stations for monitoring and controlling the renewable energy solar farm.

11. The system of claim 8, further comprising a substation in communication with the real time integrated controller, wherein the substation comprises one or more of: a VAR bank, and a transformer load tap changer.

12. The system of claim 8, wherein measuring the solar farm aggregate energy output comprises measuring one or more of: voltage, current, frequency, real power, reactive power, power factor, and power factor angle.

13. The system of claim 8, wherein measuring the individual source energy output comprises measuring one or more of: voltage, current, frequency, real power, reactive power, power factor, and power factor angle.

14. The system of claim 8, wherein the real-time integrated controller is further operable to transmit control signals and to receive monitoring signals from the one or more renewable energy sources.

15. An apparatus for controlling renewable energy, the apparatus comprising:
   a real time integrated controller operable to:
      measure aggregate energy output from a solar energy farm, wherein the solar energy farm comprises one or more renewable energy sources;
      measure individual source energy output from the one or more renewable energy sources;
      control energy production from the one or more renewable energy sources based at least in part on the measured aggregate energy output and the measured individual source energy output; and
      communicate with the one or more renewable energy sources.

16. The apparatus of claim 15, wherein the real-time integrated controller further comprises:
   one or more computer processors;
   a memory in communication with the one or more computer processors;
   input and output interfaces in communication with the one or more computer processors and operable to receive and transmit analog or digital signals; and
   a farm control module in communication with the one or more computer processors, wherein the farm control module is operable to perform one or more of the following functions: voltage regulation, power factor regulation, reactive power regulation, real power (watt) regulation, ramp rate control, startup control, shutdown control, voltage droop compensation, frequency droop compensation, and line drop compensation.

17. The apparatus of claim 15, wherein the real-time integrated controller is further operable to communicate with and be controlled by one or more remote monitoring and control stations.

18. The apparatus of claim 15, wherein the real-time integrated controller is further operable to communicate with, control or be controlled by a substation, wherein the substation comprises one or more of: a VAR bank, and a transformer load tap changer.

19. The apparatus of claim 15, wherein measuring the solar farm aggregate energy output and measuring the individual source energy output comprises measuring one or more of: voltage, current, frequency, real power, reactive power, power factor, and power factor angle.

20. The apparatus of claim 15, wherein the real-time integrated controller is further operable to transmit control signals to and to, receive monitoring signals from, the one or more renewable energy sources.

* * * * *